United States Patent [19]

Hara et al.

[11] Patent Number: 4,815,554
[45] Date of Patent: Mar. 28, 1989

[54] AIR CLEANER AND CARBURETOR LAYOUT FOR MOTORCYCLES

[75] Inventors: Naoki Hara; Nobuo Yamaguchi, both of Saitama, Japan

[73] Assignee: Honda Giken Kogyo Kabushiki Kaisha, Tokyo, Japan

[21] Appl. No.: 814,548

[22] Filed: Dec. 30, 1985

[30] Foreign Application Priority Data

Jan. 17, 1985 [JP] Japan .................................. 60-4346

[51] Int. Cl.⁴ ...................... B60K 13/02; B60K 13/04; B62K 25/20; F02B 61/02
[52] U.S. Cl. ............................... 180/219; 123/195 C; 123/198 E; 180/68.3; 180/89.2; 180/227
[58] Field of Search ............... 180/219, 218, 226, 227, 180/228, 296, 297, 309, 89.2, 68.3, 225; 123/198 E, 195 C; D12/110

[56] References Cited

U.S. PATENT DOCUMENTS

| | | | |
|---|---|---|---|
| 3,966,014 | 6/1976 | Gowing | 123/198 E |
| 4,402,379 | 9/1983 | Hoshi | 180/225 |
| 4,434,755 | 3/1984 | Kazuta et al. | 123/198 E X |
| 4,484,651 | 11/1984 | Hattori et al. | 180/225 |
| 4,592,316 | 6/1986 | Shiratsuchi et al. | 123/195 C |
| 4,597,466 | 7/1986 | Yamada | 180/225 |
| 4,650,025 | 3/1987 | Igarashi et al. | 180/227 |
| 4,671,216 | 6/1987 | Itoh | 123/198 E |

FOREIGN PATENT DOCUMENTS 38129   3/1984  Japan .................................. 180/89.2

Primary Examiner—John J. Love
Assistant Examiner—Mitchell J. Hill
Attorney, Agent, or Firm—Lyon & Lyon

[57] ABSTRACT

A two wheel motorcycle of the scooter type employing a power unit with an engine mounted forwardly of the rear wheel, a power train extending rearwardly on one side of the rear wheel to couple the engine and the rear wheel and a muffler extending along the other side of the rear wheel. A carburetor is mounted above the power train and an air cleaner for that carburetor is mounted above the muffler. A connecting tube extends transversely of the vehicle between the air cleaner and the carburetor at a location above and forwardly of the axis of the rear wheel.

2 Claims, 1 Drawing Sheet

AIR CLEANER AND CARBURETOR LAYOUT FOR MOTORCYCLES

BACKGROUND OF THE INVENTION

The field of the present invention is motorcycle design and the layout therefor.

Typically motorized cycles of the motor scooter variety have included intake systems including air cleaners and carburetors located together on a vehicle. Because of this, the sizes and shapes of such devices have been limited. In addition, when positioned near the exhaust system, special requirements were imposed as well upon the muffler.

With greater power requirements, the amount of air filtering capability and muffling capability can be inadequate given current systems. Consequently, muffling can be inadequate and, in the case of two stroke engines, exhaust length for proper tuning can be complicated. Similarly, appropriate intake tube length and diameter may also be compromised.

SUMMARY OF THE INVENTION

The present invention is directed to an arrangement for the intake system of an engine for a two wheel vehicle. In accordance with the present invention, a carburetor is located to one side of a rear wheel while the air cleaner therefor is located to the other side of that rear wheel of a two wheel vehicle. With the muffler to one side of the rear wheel and the drive train to the other side of the rear wheel, maximum use of space is accomplished. An intake tube extending from the air cleaner to the carburetor transversely of the vehicle and circumventing the rear wheel forwardly and above the axis thereof may be arranged for proper passage length and diameter with an adequately sized air cleaner to reduce flow resistance.

Accordingly, it is an object of the present invention to provide an improved arrangement for a two wheel vehicle. Other and further objects and advantages will appear hereinafter.

DETAILED DESCRIPTION OF THE PREFERRED EMBODIMENT

Figure 1:
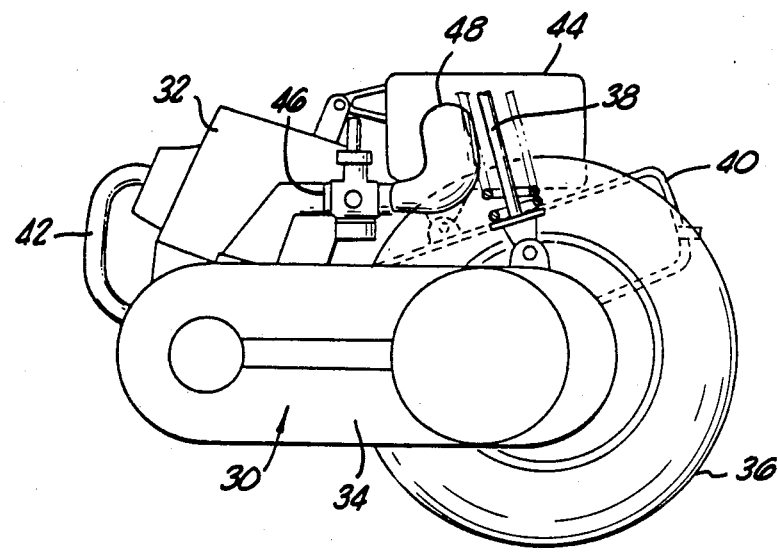
FIG. 1 is a side view of the present invention.

Turning in detail to the drawings, a two wheel motorcycle of the motor scooter variety is contemplated. The motorcycle includes a frame having a head tube, a front frame and a rear frame. Coupled with the head tube is a steering shaft to which is affixed a handlebar. A front fork mounts a front wheel. A seat is positioned on the vehicle about the rear frame. A bracket associated with the frame pivotally mounts the power unit.

The power unit 30 includes an engine 32 and a power train 34 coupled with the engine 32. The power train 34 is also coupled with a rear wheel 36. The engine 32 is shown to be located forwardly of the rear wheel 36 with the power train 34 coupled therebetween extending to one side of the rear wheel 36. A rear suspension 38 extends between the rear frame and the rear portion of the power train 34. With the power unit 30 pivotally mounted to the bracket with the suspension 38 extending to the rear portion thereof, a rear swing arm is thus defined with the power unit 30 moving therewith. The power train 34 illustrated in the preferred embodiment is a chain or V-belt drive contained within a case.

Figure 2:
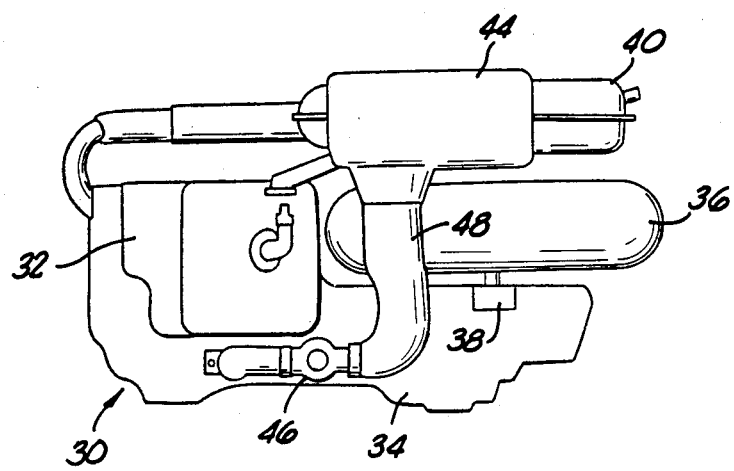
FIG. 2 is a plan view of FIG. 1.

On the opposite side of the rear wheel 36 from the power train 34 is a muffler 40. The muffler 40 is coupled to the exhausts of the engine by means of an exhaust pipe 42. The arrangement of the muffler 40 and exhaust pipe 42 coupled with the engine 32 is best illustrated in FIG. 2. As can be seen in FIG. 1, the muffler 40 is positioned as low as possible and still provide adequate clearance.

Located above the muffler 40 in the illustrated embodiment is an air cleaner 44. The air cleaner 44 is thus positioned to one side of the rear wheel 36 located immediately above the muffler 40. To the other side of the rear wheel 36 and located above the power train 34 is a carburetor 46. The carburetor 46 is coupled with the intake portion of the engine 32 in its location directly above the power train 34.

Extending transversely of the vehicle is a connecting tube 48. The connecting tube 48 extends from the air cleaner 44 ot the carburetor 46. As can be seen in FIGS. 1 and 2, the connecting tube 48 extends forwardly of and above the axis of the rear wheel 36 and is outwardly of the wheel for clearance. The length and diameter of the connecting pipe 48 may be selected for proper intake operation.

Thus, a two wheel vehicle arrangement is disclosed which provides a compact assembly and yet provides adequate room for appropriate muffler, air cleaner and intake devices. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. In a pivotally mounted power unit for a motorcycle-type vehicle having a rear wheel and an engine disposed forwardly of said rear wheel wherein said power unit carries said engine and rotatably mounts said rear wheel at one end, said power unit further comprising:
   a power train disposed forwardly of and on one side of said rear wheel to operatively couple said engine to said rear wheel;
   a muffler extending rearwardly from said engine and disposed on the other side of said rear wheel from said power train;
   a carburetor coupled with said engine;
   an air cleaner having an air flow passage communicating with said carburetor;
   said air cleaner being superposed above said muffler and said carburetor being superposed above said power train; and
   a connecting tube extending between said carburetor and said air cleaner, said connecting tube extending transversely of said power unit above and forwardly of the rotational axis of said rear wheel.

2. The improvement of claim 1 wherein said engine is substantially longitudinally aligned with said rear wheel and said power unit includes a suspension attached thereto adjacent said rear wheel.

* * * * *